(12) United States Patent
Fei et al.

(10) Patent No.: US 12,459,723 B2
(45) Date of Patent: Nov. 4, 2025

(54) VACUUM INSULATOR AND INSULATED CONTAINER

(71) Applicants: QINGDAO HAIER REFRIGERATOR CORP., LTD., Shandong (CN); HAIER SMART HOME CO., LTD., Shandong (CN)

(72) Inventors: Bin Fei, Qingdao (CN); Zhanzhan Liu, Qingdao (CN); Xiaobing Zhu, Qingdao (CN); Peng Li, Qingdao (CN)

(73) Assignees: QINGDAO HAIER REFRIGERATOR CO., LTD., Shandong (CN); HAIER SMART HOME CO., LTD., Shandong (CN)

(*) Notice: Subject to any disclaimer, the term of this patent is extended or adjusted under 35 U.S.C. 154(b) by 193 days.

(21) Appl. No.: 17/907,311

(22) PCT Filed: Feb. 18, 2021

(86) PCT No.: PCT/CN2021/076733
§ 371 (c)(1),
(2) Date: Sep. 26, 2022

(87) PCT Pub. No.: WO2021/190206
PCT Pub. Date: Sep. 30, 2021

(65) Prior Publication Data
US 2023/0106849 A1    Apr. 6, 2023

(30) Foreign Application Priority Data
Mar. 26, 2020 (CN) .......................... 202010224850.5

(51) Int. Cl.
B65D 81/38 (2006.01)
F16L 59/065 (2006.01)

(52) U.S. Cl.
CPC ........ *B65D 81/3818* (2013.01); *F16L 59/065* (2013.01)

(58) Field of Classification Search
CPC .............. B65D 81/38; B65D 81/3816; B65D 81/3813; B65D 81/3818; B65D 81/1323;
(Continued)

(56) References Cited

U.S. PATENT DOCUMENTS

| 5,273,801 A | 12/1993 | Barry et al. |
| 6,444,281 B1 | 9/2002 | Wang et al. |

(Continued)

FOREIGN PATENT DOCUMENTS

| CN | 203603399 U | 5/2014 |
| CN | 104746742 A * | 7/2015 |

(Continued)

OTHER PUBLICATIONS

Machine translation of CN 104746742 (Year: 2015).*
(Continued)

*Primary Examiner* — Javier A Pagan
(74) *Attorney, Agent, or Firm* — troutman pepper locke; Tim Tingkang Xia, Esq.

(57) ABSTRACT

Disclosed is a vacuum insulator, comprising: a metal plate; a glass plate arranged facing and spaced apart from the metal plate; and a sealing structure arranged between the metal plate and the glass plate for fixing the metal plate and the glass plate in a sealed manner, with a vacuum cavity being defined between the metal plate and the glass plate. The vacuum insulator is impact-resistant, has a stable structure, and can be independently used for manufacturing an insulated container. The insulated container having the vacuum insulator is also involved.

10 Claims, 6 Drawing Sheets

(58) Field of Classification Search
CPC ......... F16L 59/06; F16L 59/065; F16L 59/07; F16L 59/075
See application file for complete search history.

(56) References Cited

U.S. PATENT DOCUMENTS

| | | | |
|---|---|---|---|
| 6,558,494 | B1 | 5/2003 | Wang et al. |
| 2010/0313876 | A1 | 12/2010 | Palmieri |
| 2018/0094475 | A1 | 4/2018 | Naito et al. |
| 2018/0344053 | A1 | 12/2018 | Schreiber et al. |

FOREIGN PATENT DOCUMENTS

| | | | | |
|---|---|---|---|---|
| CN | 107893611 | A | | 4/2018 |
| CN | 108662824 | A | | 10/2018 |
| CN | 212776284 | U | | 3/2021 |
| DE | 2520062 | A1 | | 11/1976 |
| WO | WO 0190525 | A1 | | 11/2001 |
| WO | WO 2012/050308 | A3 | | 4/2012 |
| WO | WO-2012050308 | A2 | * | 4/2012 ............. C03C 27/06 |

OTHER PUBLICATIONS

International Search Report and Written Opinion for PCT/CN2021/076733 (ISA/CN) mailed May 26, 2021 with English translation (8 pages).
Partial Supplementary European Search Report for EP Patent Application No. 21774855.7 dated Jun. 20, 2023 (13 pages).
1st Office Action for European Patent Application No. 21774855.7 dated Oct. 2, 2023 (6 pages).
Supplementary European Search Report for EP Patent Application No. 21774855.7 dated Sep. 20, 2023 (7 pages).
1st Office Action for China Patent Application No. 202010224850.5 dated Nov. 20, 2024, w/English translation (21 pages).

* cited by examiner

VACUUM INSULATOR AND INSULATED CONTAINER

CROSS-REFERENCE TO RELATED APPLICATIONS

This application is a national phase entry of International Application No. PCT/CN2021/076733, filed Feb. 18, 2021, which claims priority to Chinese Application No. 202010224850.5, filed Mar. 26, 2020, the entire contents each of which are incorporated herein by reference.

FIELD OF THE INVENTION

The present invention relates to the technical field of vacuum insulation, and particularly relates to a vacuum insulator and an insulated container.

BACKGROUND OF THE INVENTION

In the known vacuum insulators, the first one is a vacuum insulation panel (that is VIP). Due to the limitation of strength and appearance, the VIP cannot be used independently and needs to be embedded in a polyurethane foam layer for use, or additional appearance protection needs to be added to the periphery of the VIP, so that the structure is complicated. The second one is vacuum glass. Because the glass is transparent, has large radiation heat transfer and is not resistant to impact, and frames for fixing the glass are difficult to shape, the manufacturing cost is high. The third one is a vacuum steel plate insulator which is mostly used for barrel-shaped products, such as vacuum cups and LNG tanks. Due to the thermal bridge effect at the seal edge caused by the heat transfer between the inner and outer shells, the vacuum steel plate insulator is difficult to be made into a flat plate, which limits the application scenes of insulated containers.

BRIEF DESCRIPTION OF THE INVENTION

An objective of the present invention is to provide a vacuum insulator which has a stable structure and is impact-resistant.

A further objective of the present invention is to provide a vacuum insulator with a good insulating effect.

Another further objective of the present invention is to provide an insulated container which is easy to assemble and has a good thermal insulation effect.

Specifically, the present invention provides a vacuum insulator, including:
 a metal plate;
 a glass plate arranged facing and spaced apart from the metal plate; and
 a sealing structure arranged between the metal plate and the glass plate for sealed fixing of the metal plate and the glass plate, with a vacuum cavity being defined between the metal plate and the glass plate.

Optionally, the sealing structure includes a nickel-plated layer and a solder sheet; and
 the nickel-plated layer is formed on an upper surface of the glass plate, the solder sheet is arranged between the nickel-plated layer and a lower surface of the metal plate, and the sealed fixing of the metal plate and the glass plate is realized by welding the nickel-plated layer and the solder sheet.

Optionally, the sealing structure includes a metal sheet and glass powder slurry; and
 the glass powder slurry is arranged on the upper surface of the glass plate, the metal sheet is arranged between the glass powder slurry and the lower surface of the metal plate, and the sealed fixing of the metal plate and the glass plate is realized by melting the glass powder slurry and welding the metal sheet.

Optionally, the sealing structure includes a silicone layer, and the sealed fixing of the metal plate and the glass plate is realized by bonding of the silicone layer.

Optionally, the vacuum insulator further includes a plurality of support components, arranged in the vacuum cavity and configured to be fixed to the metal plate and/or the glass plate, so as to provide support between the metal plate and the glass plate.

Optionally, a thickness of the metal plate is 1-1.5 mm;
 a thickness of the glass plate is 2-4 mm;
 a distance between the metal plate and the glass plate is 0.15-1 mm; and
 a width of the sealing structure is 10-15 mm.

The present invention further provides an insulated container, including:
 a box body, defined with a storage space inside and provided with a storage opening for storing articles; and
 a door body, arranged on a front side of the storage opening and configured to open and close the storage space, wherein
 at least a part of the box body and/or the door body is the above-mentioned vacuum insulator.

Optionally, the metal plate has a body part and a bent part;
 the body part is arranged facing the glass plate; and
 the bent part extends from a tail end of the body part toward one side where the glass plate is located, so that a groove is defined between an inner surface of the bent part and a tail end of the glass plate.

Optionally, the box body includes a main body frame, a fixing component and a plurality of vacuum insulators; and
 the main body frame is of a cuboid structure defined by a plurality of edges, and the plurality of vacuum insulators are fixed to the main body frame through the fixing component to define the box body, wherein the metal plates of the vacuum insulators constitute an outer shell of the box body, and the glass plates constitute an inner shell of the box body.

Optionally, the fixing component has a main body part, two extension parts and two inserting parts; and
 two adjacent vacuum insulators are spliced and fixed through the fixing component, wherein the main body part is configured to be clamped between outer surfaces of the bent parts of the two vacuum insulators, the two extension parts are configured to extend from the main body part between the glass plates of the two vacuum insulators and the edges of the main body frame respectively, and the two inserting parts are configured to be respectively inserted into the grooves of the two vacuum insulators.

Optionally, the door body includes a connecting frame, a door seal and a vacuum insulator;
 the connecting frame has a first frame part and a second frame part;
 the first frame part has a protrusion matched with the groove, and the fixing of the vacuum insulator and the connecting frame is realized by fitting the protrusion with the groove;
 the second frame part is formed on one side of the first frame part close to the box body, and the fixing of the door seal and the connecting frame is realized by fixing the door seal and the second frame part; and the metal plate of the vacuum insulator constitutes an outer plate of the door body, and the glass plate constitutes an inner plate of the door body.

The vacuum insulator of the present invention includes the metal plate and the glass plate which are arranged facing and spaced apart from each other, and the sealing structure is used for fixing the metal plate and the glass plate in a sealed manner, so that the vacuum insulator is impact-resistant, has a stable structure and can be independently used for manufacturing an insulated container. Moreover, when the vacuum insulator is used for manufacturing the insulated container, the metal plate is used as an outer plate of the insulated container, and the glass plate is used as an inner plate of the insulated container, so that the radiation heat transfer is small.

Further, the sealing structure of the vacuum insulator of the present invention includes the nickel-plated layer and the solder sheet, or the metal sheet and the glass powder slurry, or the silicone layer, so that the metal plate and the glass plate can be tightly sealed to avoid air leakage caused by poor sealing.

The above and other objectives, advantages and features of the present invention will be more apparent to those skilled in the art according to the following detailed description of the specific embodiments of the present invention in conjunction with the accompanying drawings.

BRIEF DESCRIPTION OF THE DRAWINGS

Some specific embodiments of the present invention will be described in detail below by way of example and not limitation with reference to the accompanying drawings. The same reference numerals in the accompanying drawings indicate the same or similar components or parts. Those skilled in the art should understand that these accompanying drawings are not necessarily drawn to scale. In the accompanying drawings.

DETAILED DESCRIPTION

Figure 1:
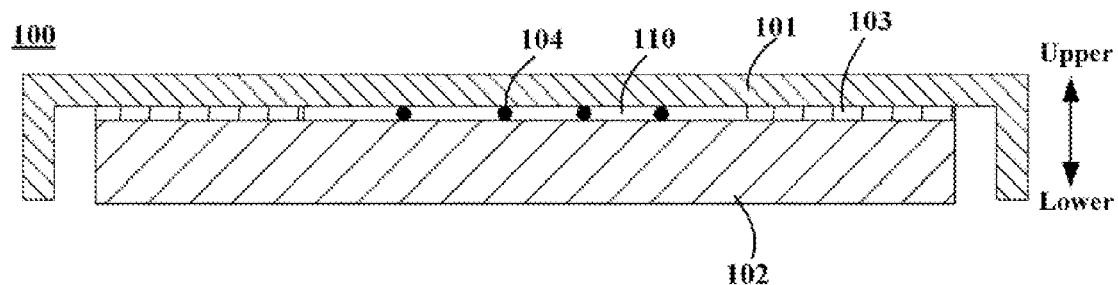
FIG. 1 is a schematic cross-sectional structural view of a vacuum insulator according to an embodiment of the present invention.
Figure 5:
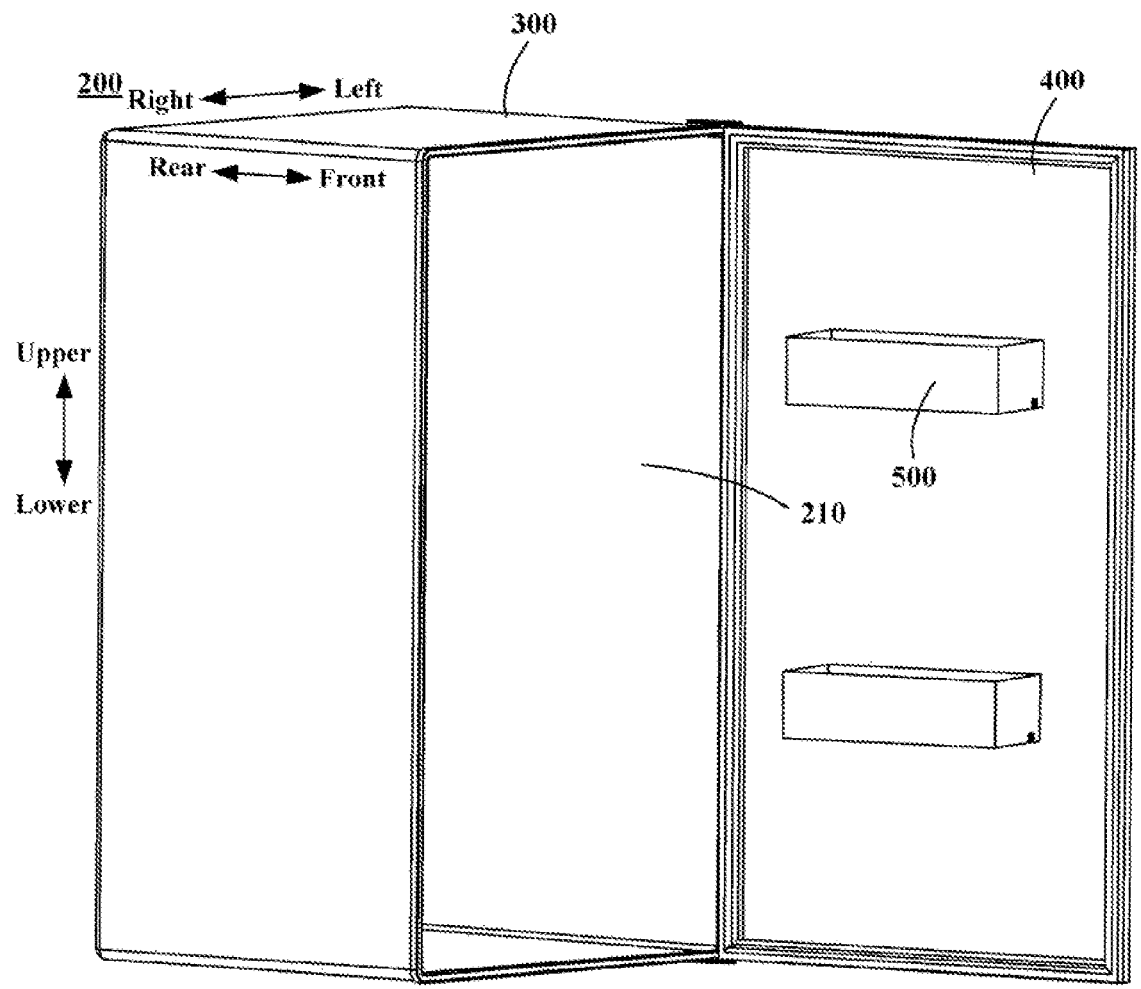
FIG. 5 is a schematic structural view of an insulated container according to an embodiment of the present invention.

In the following description, the "upper" and "lower" orientations of a vacuum insulator 100 are orientations based on the vacuum insulator 100 itself as a reference, as shown in FIG. 1; and the orientations or position relationships indicated by "front", "rear", "upper", "lower", "left", "right" and the like of an insulated container 200 are orientations based on the insulated container 200 itself as a reference, as shown in FIG. 5.

FIG. 1 is a schematic cross-sectional structural view of a vacuum insulator 100 according to an embodiment of the present invention. As shown in FIG. 1, the vacuum insulator 100 in the embodiment of the present invention includes a metal plate 101, a glass plate 102 and a sealing structure 103. The glass plate 102 is arranged facing and spaced apart from the metal plate 101. The sealing structure 103 is arranged between the metal plate 101 and the glass plate 102 for fixing the metal plate 101 and the glass plate 102 in a sealed manner, and a vacuum cavity 110 is defined between the metal plate 101 and the glass plate 102. The vacuum insulator 100 in the embodiment of the present invention can reduce convection heat transfer by vacuumizing the space between the metal plate 101 and the glass plate 102 which are hermetically sealed. The vacuum insulator 100 can be used for an insulated container 200. The metal plate 101 is used as an outer plate of the vacuum insulator 100, so that the entire vacuum insulator 100 has a stable structure, and an independent appearance structure is maintained. The glass plate 102 is used as an inner plate of the vacuum insulator 100, so that the entire vacuum insulator 100 has small radiation heat transfer. Moreover, the vacuum insulator 100 may be substantially of a flat plate structure, so that the application scenes of the insulated container 200 are increased, and the needs of users are better met. A vacuum degree of the vacuum cavity 110 of the vacuum insulator 100 in the embodiment of the present invention is $10^{-1}$-$10^{-3}$ Pa. In some embodiments, the metal plate 101 is a stainless steel plate, which may be a stainless steel plate with a mirrored or vapor-deposited inner surface, such as 304 stainless steel. By using the stainless steel plate, the strength of the vacuum insulator 100 can be ensured, the appearance is beautiful, the radiation heat transfer can be reduced, and the air leakage caused by corrosion and rusting can be avoided.

The thickness of the metal plate 101 and the thickness of the glass plate 102 may be the same or different. In some embodiments, the thickness of the metal plate 101 is 1-1.5 mm, such as 1 mm, 1.2 mm, and 1.5 mm; and the thickness of the glass plate 102 is 2-4 mm, such as 2 mm, 3 mm, and 4 mm. Before the present invention, when faced with the problem of ensuring the insulating effect, those skilled in the art usually increase the thickness of the two plates, for example, using a plate with a thickness greater than 10 mm. The applicant creatively realizes that the thickness of the two plates is not as large as possible. In the design scheme of increasing the thickness of the plate, the entire vacuum insulator 100 will be too heavy, which will cause adverse effects on the use of the vacuum insulator 100. In addition, when the vacuum insulator 100 is used for the insulated container 200, there is also a problem that the internal volume of the insulated container 200 is thereby reduced. Therefore, the applicant breaks the conventional design idea and creatively proposes the limitation of the thickness of the two plates, so as to reduce the space occupied by the vacuum insulator 100 and ensure the insulating effect at the same time. The width of the sealing structure 103 is 10-15 mm, such as 10 mm, 12 mm, and 15 mm. Through a large number of experimental studies, the width of the sealing structure 103 is preferably limited to be 10-15 mm, which can ensure tight sealing and can prevent the volume of the vacuum cavity 110 from being reduced due to the excessively wide sealing structure 103, so that the vacuum insulator 100 has a good insulating effect. The distance between the metal plate 101 and the glass plate 102 is 0.15-1 mm, such as 0.15 mm, 0.5 mm, and 1 mm. The distance between the metal plate 101 and the glass plate 102 is set to be 0.15-1 mm, which can meet different insulation and product requirements. In addition, in order to further reduce the thermal radiation of the glass, a LOW-E film layer can be added on the glass plate 102, and it should be understood that the addition of the LOW-E film layer will increase the manufacturing cost.

Figure 2:
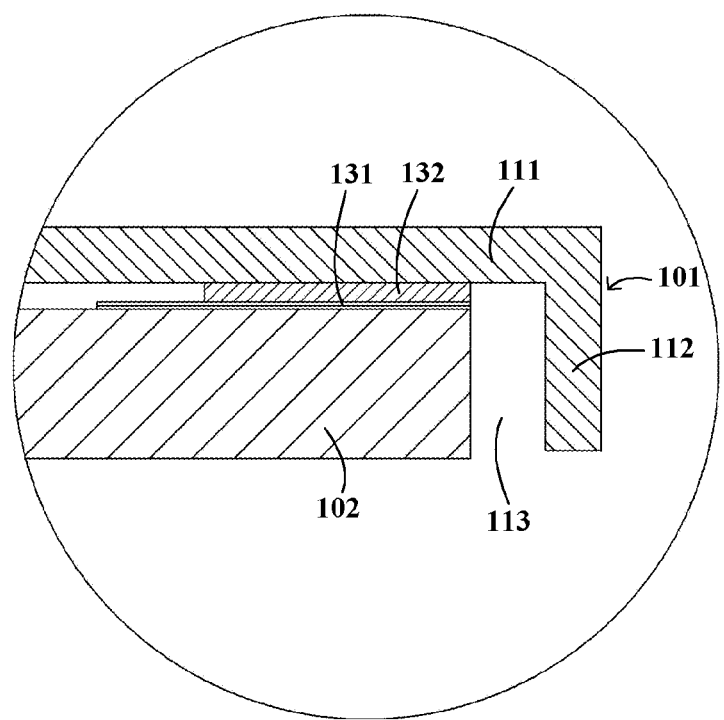
FIG. 2 is a schematic structural view of a sealing structure of the vacuum insulator shown in FIG. 1.
Figure 3:
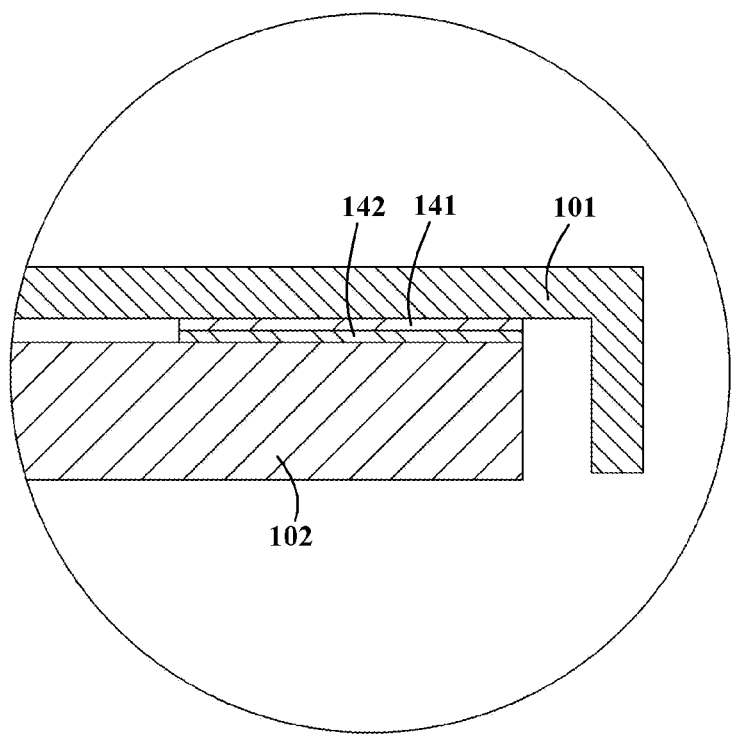
FIG. 3 is another schematic structural view of the sealing structure of the vacuum insulator shown in FIG. 1.
Figure 4:
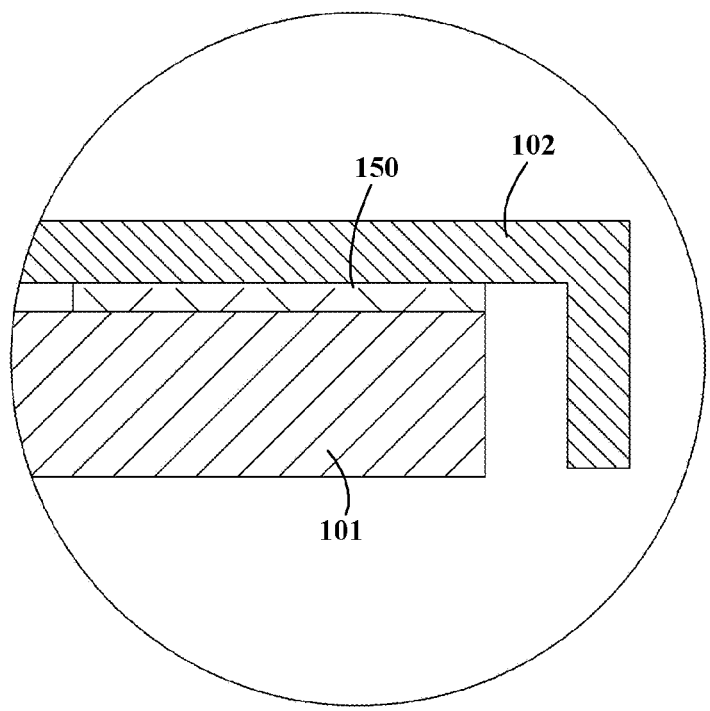
FIG. 4 is yet another schematic structural view of the sealing structure of the vacuum insulator shown in FIG. 1.

The sealing structure 103 needs to be tightly combined with the glass plate 102 and the metal plate 101 to ensure the tight connection between the glass and the metal plate 101. FIG. 2 is a schematic structural view of the sealing structure 103 of the vacuum insulator 100 shown in FIG. 1. FIG. 3 is another schematic structural view of the sealing structure 103 of the vacuum insulator 100 shown in FIG. 1. FIG. 4 is yet another schematic structural view of the sealing structure 103 of the vacuum insulator 100 shown in FIG. 1.

As shown in FIG. 2, the sealing structure 103 includes a nickel-plated layer 131 and a solder sheet 132. The nickel-plated layer 131 is formed on an upper surface of the glass plate 102, the solder sheet 132 is arranged between the nickel-plated layer 131 and a lower surface of the metal plate 101, and the sealed fixing of the metal plate 101 and the glass plate 102 is realized by welding the nickel-plated layer 131 and the solder sheet 132. By forming the nickel-plated layer 131 on the upper surface of the glass plate 102 and arranging the solder sheet 132 between the nickel-plated layer 131 and the lower surface of the metal plate 101, the metal plate 101 and the glass plate 102 can be tightly sealed to avoid air leakage caused by poor sealing. The thickness of the nickel-plated layer 131 may be 1-2 μm. The thickness of the solder sheet 132 may be 0.08-0.12 mm, such as 0.1 mm. The thickness of the nickel-plated layer 131 is 1-2 μm, which can meet the needs of adhesion and metal welding. The thickness of the solder sheet 132 is 0.08-0.12 mm, which not only considers the welding strength, but also avoids the heat conduction.

A method for manufacturing the vacuum insulator 100 includes the following steps:
nickel plating treatment is performed on the glass plate 102 to form the nickel-plated layer 131 on the upper surface of the glass plate 102;
the solder sheet 132 is placed between the nickel-plated layer 131 and the metal plate 101;
the air between the glass plate 102 and the metal plate 101 is extracted through a gap between the solder sheet 132 and the metal plate 101; and
the solder sheet 132 and the metal plate 101 are sealed by welding to obtain the vacuum insulator 100.

The nickel plating treatment on the glass plate 102 can be performed by using a method for plating nickel on glass disclosed in the prior art, which will not be described in detail here. The solder sheet 132 may be a silver-copper solder sheet, where Ag:Cu=72:28. A vacuumizing treatment and the welding sealing treatment are performed in a vacuum furnace. The vacuumizing treatment is performed until a vacuum degree is $10^{-1}$-$10^{-3}$ Pa. A welding temperature is 750-850° C., such as 800° C. After the treatment is completed, the temperature is kept for 1-2 min, and then, the vacuum insulator 100 is taken out of the vacuum furnace.

As shown in FIG. 3, in some other embodiments, the sealing structure 103 includes a metal sheet 141 and glass powder slurry 142. The glass powder slurry 142 is arranged on the upper surface of the glass plate 102, the metal sheet 141 is arranged between the glass powder slurry 142 and the lower surface of the metal plate 101, and the sealed fixing of the metal plate 101 and the glass plate 102 is realized by melting the glass powder slurry 142 and welding the metal sheet 141. The metal sheet 141 is fixed on the surface of the glass plate 102 by the glass powder slurry 142, and the sealed fixing of the glass plate 102 and the metal plate 101 is realized by the metal sheet 141, so that the metal plate 101 and the glass plate 102 can be tightly sealed to avoid air leakage caused by poor sealing. The metal sheet 141 may be a metal strip. The metal sheet 141 may be a Kovar alloy sheet, such as a chromium-iron alloy sheet and an iron-nickel-cobalt alloy sheet.

A method for manufacturing the vacuum insulator 100 includes the following steps:
the glass powder slurry 142 is coated on the metal sheet 141;
the metal sheet 141 is attached to the upper surface of the glass plate 102 and the metal sheet 141 is fixed to the glass plate 102 by heating melting;
the air between the glass plate 102 and the metal plate 101 is extracted through a gap between the metal sheet 141 and the metal plate 101; and
the metal sheet 141 and the metal plate 101 are sealed by welding to obtain the vacuum insulator 100.

A heating melting temperature is 440-460° C. which can melt the slurry, but cannot melt the glass. The vacuumizing treatment and the welding sealing treatment are performed in a vacuum furnace. The vacuumizing treatment is performed until a vacuum degree is $10^{-1}$-$10^{-3}$ Pa. A welding temperature is 750-850° C., such as 800° C. After the treatment is completed, the temperature is kept for 1-2 min, and then, the vacuum insulator 100 is taken out of the vacuum furnace.

As shown in FIG. 4, in some other embodiments, the sealing structure 103 includes a silicone layer 150. The sealed fixing of the metal plate 101 and the glass plate 102 is realized by bonding of the silicone layer 150 to avoid air leakage caused by poor sealing. The silicone may be quick-drying silicone, which has the strength properties of structural adhesive and the toughness of silicone, has good air tightness, and can be tightly combined with the glass plate 102 and the metal plate 101. In some embodiments, the thickness of the silicone layer 150 is 0.3-1 mm, such as 0.3 mm, 0.5 mm, and 1 mm. The thickness of the silicone layer 150 is 0.3-1 mm, which can consider structural strength, toughness, heat insulation and degassing.

As shown in FIG. 1, in some embodiments, the vacuum insulator 100 further includes: a plurality of support components 104, arranged in the vacuum cavity 110 and configured to be fixed to the metal plate 101 and/or the glass plate 102, so as to provide support between the metal plate 101 and the glass plate 102. By arranging the plurality of support components 104 in the vacuum cavity 110, the metal plate 101 and the glass plate 102 can be supported to enhance the strength of the entire vacuum insulator 100. The support components 104 are directly fixed to the metal plate 101 and/or the glass plate 102, so that the arranging process of the support components 104 is simplified, and the manufacturing process of the entire vacuum insulator 100 is simplified. The support components 104 may be such as quartz glass columns, polytetrafluoroethylene columns, dotted ceramic or glass microbeads, and the quartz glass columns, the polytetrafluoroethylene columns or the glass microbeads can be bonded to the lower surface of the metal plate 101 and/or the upper surface of the glass plate 102 by silicone.

The vacuum insulator 100 in the embodiments of the present invention solves the problems of structural strength, heat transfer, support and sealing, so that the vacuum insulator 100 can be actually produced and used, and especially, the vacuum insulator 100 can be used for an insulated container 200. FIG. 5 is a schematic structural view of an insulated container 200 according to an embodiment of the present invention. The insulated container 200 includes a box body 300 and a door body 400. A storage space 210 is defined in the box body 300, and the box body 300 is provided with a storage opening for storing articles. The door body 400 is arranged on a front side of the storage opening and configured to open and close the storage space 210. At least a part of the box body 300 and/or the door body 400 is the vacuum insulator 100. Preferably, the entire box body 300 and the door body 400 are both the vacuum insulators 100. As shown in FIG. 5, generally, the storage opening of the box body 300 is located on a front side of the box body 300, and the door body 400 is correspondingly arranged in front of the box body 300. The vacuum insulator 100 in the embodiments of the present invention may be substantially of a flat plate shape, so that the insulated container 200 manufactured therefrom may have various variations, and the application scenes of the insulated container 200 are increased. The insulated container 200 of the present invention can also be designed and used as a part of a smart home.

Figure 6:
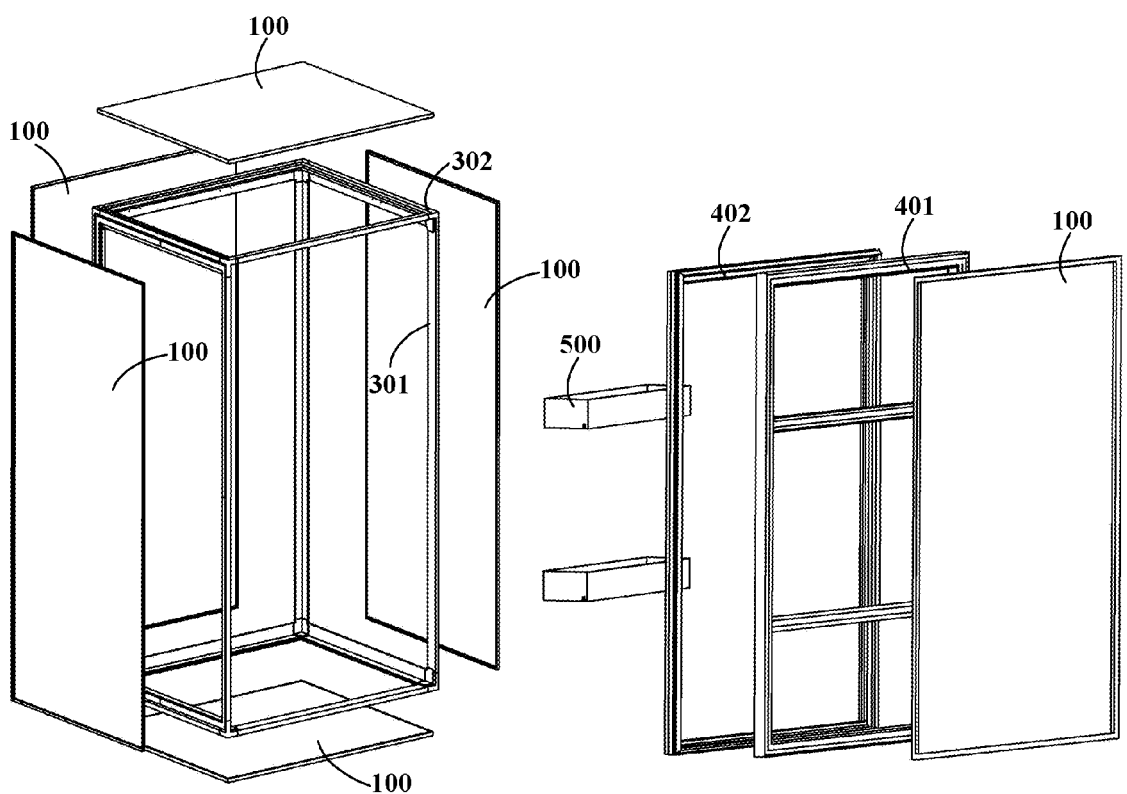
FIG. 6 is a schematic exploded view of the insulated container shown in FIG. 5.

Referring to FIG. 5, in some embodiments, the box body 300 includes a main body frame 301, a fixing component 302 and a plurality of vacuum insulators 100. The main body frame 301 is of a cuboid structure defined by a plurality of edges, and the plurality of vacuum insulators 100 are fixed to the main body frame 301 through the fixing component 302 to define the storage space 210, wherein the metal plates 101 constitutes an outer shell of the box body 300, the glass plates 102 constitutes an inner shell of the box body 300, and the storage space 210 is at an inner side of the glass plate 102 away from the metal plate 101. The box body 300 is formed by the vacuum insulators 100, so that a smaller wall thickness of the insulated container 200 can be maintained, the thermal insulation effect of the insulated container 200 can be ensured, and at the same time, the internal volume of the insulated container 200 is thus increased. FIG. 6 is a schematic exploded view of the insulated container 200 shown in FIG. 5. According to the insulated container 200 in the embodiment of the present invention, the vacuum insulators 100 are fixed to the main body frame 301 by the fixing component 302 to form the box body 300, so that the manufacturing process of the insulated container 200 is simple, thereby reducing the cost.

Referring to FIG. 1 and FIG. 2, the metal plate 101 of the vacuum insulator 100 in the embodiments of the present invention has a body part 111 and a bent part 112. The body part 111 is arranged facing the glass plate 102. The bent part 112 extends from a tail end of the body part 111 toward one side where the glass plate 102 is located, so that a groove 113 is defined between an inner surface of the bent part 112 and a tail end of the glass plate 102.

Figure 7:
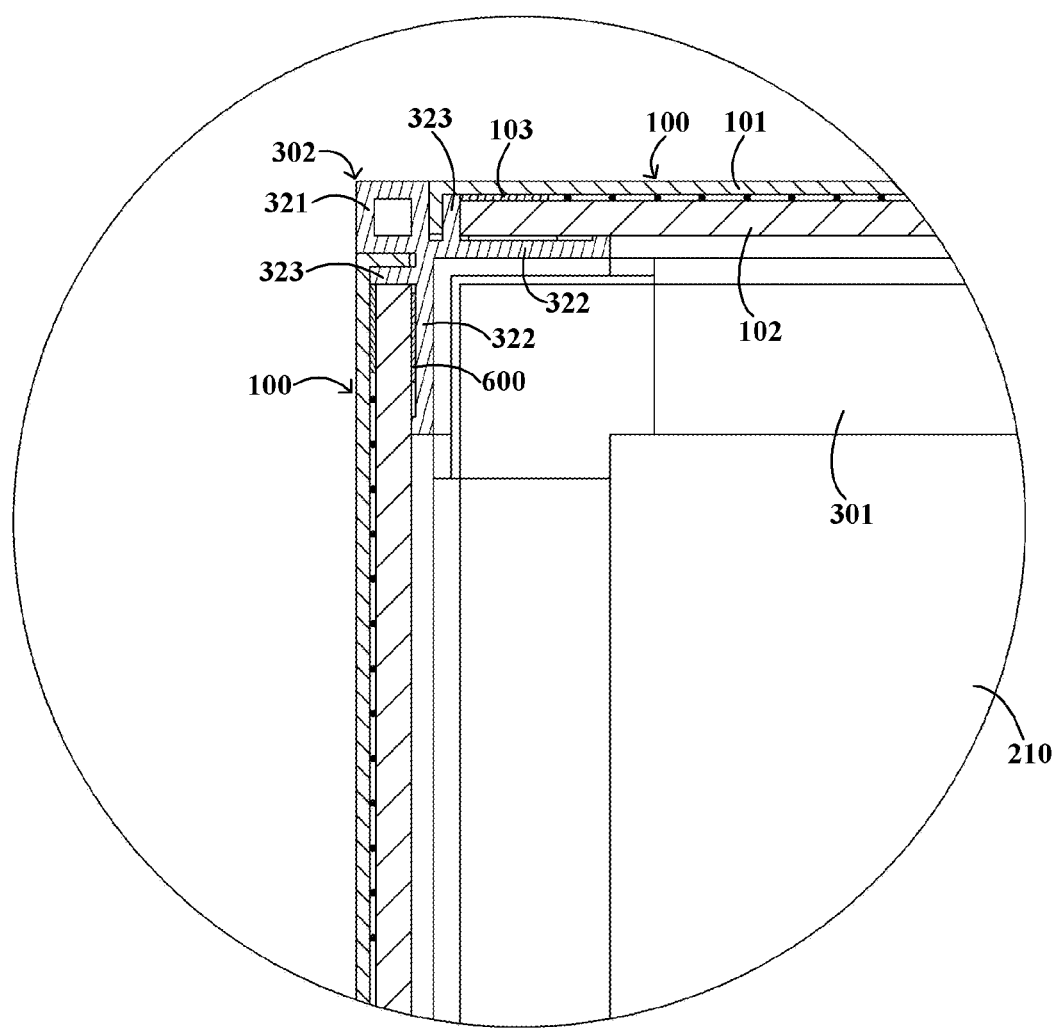
FIG. 7 is a schematic partial cross-sectional structural view of a box body of the insulated container shown in FIG. 5.

FIG. 7 is a schematic partial cross-sectional structural view of the box body 300 of the insulated container 200 shown in FIG. 5. The fixing component 302 of the box body 300 of the insulated container 200 in the embodiment of the present invention has a main body part 321, two extension parts 322 and two inserting parts 323. Two adjacent vacuum insulators 100 are spliced and fixed through the fixing component 302, wherein the main body part 321 is configured to be clamped between outer surfaces of the bent parts 112 of the two vacuum insulators 100, the two extension parts 322 are configured to extend from the main body part 321 between the glass plates 102 of the two vacuum insulators 100 and the edges of the main body frame 301 respectively, and the two inserting parts 323 are configured to be respectively inserted into the grooves 113 of the two vacuum insulators 100. By configuring the fixing component 302 in a structure having the main body part 321, the two extension parts 322 and the two inserting parts 323 and configuring the vacuum insulator 100 in a structure having the groove 113, the splicing between the vacuum insulators 100 and the fixing between the vacuum insulators 100 and the main body frame 301 are very convenient to realize, and stable fixing thereof can be realized by arranging the extension parts 322 and the inserting parts 323. The fixing component 302 may be a plastic component, such as ABS plastic. In addition, a bonding agent 600 may be used between the glass plate 102 and the extension parts 322 of the fixing component 302 to make the assembly more stable.

Figure 8:
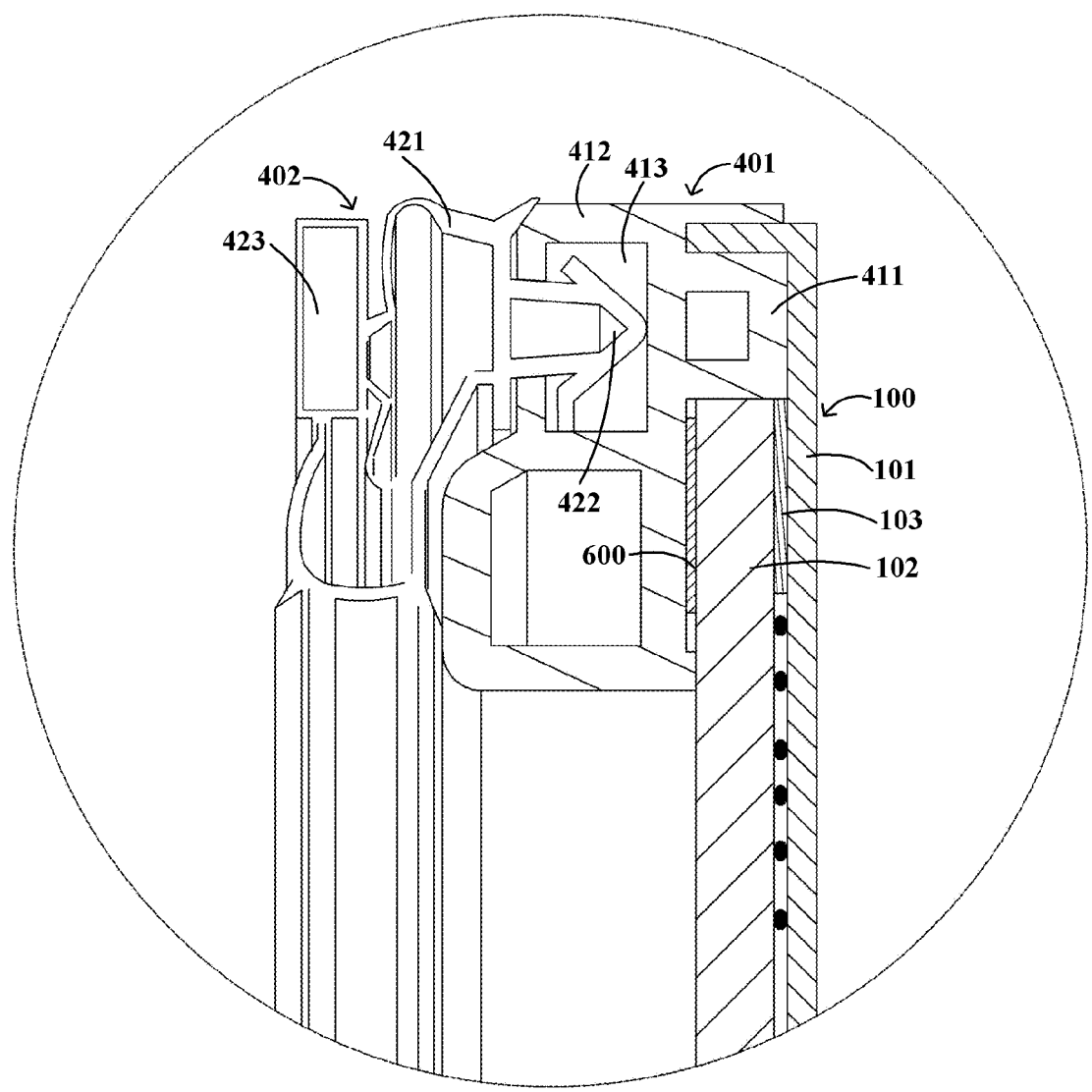
FIG. 8 is a schematic partial cross-sectional structural view of a door body of the insulated container shown in FIG. 5.

Continuing to refer to FIG. 5, in some embodiments, the door body 400 of the insulated container 200 in the embodiments of the present invention includes a connecting frame 401, a door seal 402 and the vacuum insulator 100. The connecting frame 401 has a first frame part 411 and a second frame part 412. The first frame part 411 has a protrusion (not numbered in the figure) matched with the groove 113, and the fixing of the vacuum insulator 100 and the connecting frame 401 is realized by fitting the protrusion with the groove 113. The second frame part 412 is formed on one side of the first frame part 411 close to the box body 300, and the fixing of the door seal 402 and the connecting frame 401 is realized by fixing the door seal 402 and the second frame part 412, wherein the metal plate 101 constitutes an outer plate of the door body 400, and the glass plate 102 constitutes an inner plate of the door body 400. FIG. 8 is a schematic partial cross-sectional structural view of the door body 400 of the insulated container 200 shown in FIG. 5. A side surface of the second frame part 412 away from the first frame part 411 is concave to form an accommodating cavity 413. The door seal 402 includes an air bag 421, a base 422 and a magnetic strip 423. The base 422 is accommodated in the accommodating cavity 413. The magnetic strip 423 is arranged on the air bag 421 and cooperates with the metal plate 101 of the box body 300 to attract the door seal 402 on the box body 300. The door body 400 has an ingenious structure. The first frame part 411 and the second frame part 412 of the connecting frame 401 are used for stably fixing the vacuum insulator 100 with the door seal 402 and the connecting frame 401, and the integrity of the appearance of the door body 400 can be maintained, so that the sensory experience of a user can be improved. The connecting frame 401 may be a plastic component, such as ABS plastic. In addition, a bonding agent 600 may be used between the glass plate 102 and the connecting frame 401 to make the assembly more stable. As shown in FIG. 5, a plurality of bottle holders 500 may also be arranged on an inner side of the door body 400 to store articles.

The vacuum insulator 100 in the embodiments of the present invention includes the metal plate 101 and the glass plate 102 which are arranged facing and spaced apart from each other, and the sealing structure 103 is used for fixing the metal plate 101 and the glass plate 102 in a sealed manner, so that the vacuum insulator 100 is impact-resistant, has a stable structure and can be independently used for manufacturing the insulated container 200. Moreover, when the vacuum insulator 100 is used for manufacturing the insulated container 200, the metal plate 101 is used as an outer plate of the insulated container 200, and the glass plate 102 is used as an inner plate of the insulated container 200, so that the radiation heat transfer is small.

Further, the sealing structure 103 of the vacuum insulator 100 in the embodiments of the present invention includes the nickel-plated layer 131 and the solder sheet 132, or the metal sheet 141 and the glass powder slurry 142, or the silicone layer 150, so that the metal plate 101 and the glass plate 102 can be tightly sealed to avoid air leakage caused by poor sealing.

Hereto, those skilled in the art should realize that although a plurality of exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and deemed to cover all such other variations or modifications.

The invention claimed is:

1. A vacuum insulator, comprising:
a metal plate;
a glass plate arranged facing and spaced apart from the metal plate; and
a sealing structure arranged between the metal plate and the glass plate and directly contacting the metal plate and the glass plate for sealed fixing of the metal plate and the glass plate, with a vacuum cavity being defined between the metal plate and the glass plate;
wherein the sealing structure comprises a nickel-plated layer and a solder sheet; and
the nickel-plated layer is formed on an upper surface of the glass plate, the solder sheet is arranged between the nickel-plated layer and a lower surface of the metal plate and directly contacting the lower surface of the metal plate, and the sealed fixing of the metal plate and the glass plate is realized by welding the solder sheet to the nickel-plated layer and the metal plate.

2. The vacuum insulator according to claim 1, wherein the sealing structure comprises a metal sheet and glass powder slurry; and
the glass powder slurry is arranged on an upper surface of the glass plate, the metal sheet is arranged between the glass powder slurry and a lower surface of the metal plate, and the sealed fixing of the metal plate and the glass plate is realized by melting the glass powder slurry and welding the metal sheet.

3. The vacuum insulator according to claim 1, wherein the sealing structure comprises a silicone layer, and the sealed fixing of the metal plate and the glass plate is realized by bonding of the silicone layer.

4. The vacuum insulator according to claim 1, further comprising:
a plurality of support components, arranged in the vacuum cavity and configured to be fixed to the metal plate and/or the glass plate, so as to provide support between the metal plate and the glass plate.

5. The vacuum insulator according to claim 1, wherein
a thickness of the metal plate is 1-1.5 mm;
a thickness of the glass plate is 2-4 mm;
a distance between the metal plate and the glass plate is 0.15-1 mm; and
a width of the sealing structure is 10-15 mm.

6. An insulated container, comprising:
a box body, defined with a storage space inside and provided with a storage opening for storing articles; and
a door body, arranged on a front side of the storage opening and configured to open and close the storage space, wherein
at least a part of the box body and/or the door body is the vacuum insulator according to claim 1.

7. The insulated container according to claim 6, wherein
the metal plate has a body part and a bent part;
the body part is arranged facing the glass plate; and
the bent part extends from a tail end of the body part toward one side where the glass plate is located, so that a groove is defined between an inner surface of the bent part and a tail end of the glass plate.

8. The insulated container according to claim 7, wherein
the box body comprises a main body frame, a fixing component and a plurality of the vacuum insulators; and
the main body frame is of a cuboid structure defined by a plurality of edges, and the plurality of vacuum insulators are fixed to the main body frame through the fixing component to define the box body, wherein the metal plates of the vacuum insulators constitute an outer shell of the box body, and the glass plates constitute an inner shell of the box body.

9. The insulated container according to claim 8, wherein
the fixing component has a main body part, two extension parts and two inserting parts; and
two adjacent vacuum insulators are spliced and fixed through the fixing component, wherein the main body part is configured to be clamped between outer surfaces of the bent parts of the two vacuum insulators, the two extension parts are configured to extend from the main body part between the glass plates of the two vacuum insulators and the edges of the main body frame respectively, and the two inserting parts are configured to be respectively inserted into the grooves of the two vacuum insulators.

10. The insulated container according to claim 7, wherein
the door body comprises a connecting frame, a door seal and the vacuum insulator;
the connecting frame has a first frame part and a second frame part;
the first frame part has a protrusion matched with the groove, and the fixing of the vacuum insulator and the connecting frame is realized by fitting the protrusion with the groove;
the second frame part is formed on one side of the first frame part close to the box body, and the fixing of the door seal and the connecting frame is realized by fixing the door seal and the second frame part; and
the metal plate of the vacuum insulator constitutes an outer plate of the door body, and the glass plate constitutes an inner plate of the door body.

* * * * *